Feb. 19, 1957 A. G. THOMAS 2,781,848

TRACING AND REPRODUCING DEVICES

Filed Aug. 10, 1953 6 Sheets-Sheet 1

INVENTOR
Albert G. Thomas

INVENTOR
Albert G. Thomas

Feb. 19, 1957 A. G. THOMAS 2,781,848

TRACING AND REPRODUCING DEVICES

Filed Aug. 10, 1953 6 Sheets-Sheet 3

Albert G. Thomas INVENTOR

Albert G. Thomas INVENTOR

Feb. 19, 1957 A. G. THOMAS 2,781,848

TRACING AND REPRODUCING DEVICES

Filed Aug. 10, 1953 6 Sheets-Sheet 5

Albert G. Thomas INVENTOR

TRACING AND REPRODUCING DEVICES

Albert G. Thomas INVENTOR

1

2,781,848

TRACING AND REPRODUCING DEVICES

Albert G. Thomas, Chattanooga, Tenn.

Application August 10, 1953, Serial No. 373,187

36 Claims. (Cl. 164—115)

This invention relates to recording devices and has for a primary purpose the provision of means for making a marked, punched, magnetized, or other tape, belt, or similar record to represent the configuration of an object. This tape or belt can then be used with an automatic machine tool control to cause a machine tool to reproduce the object in two, or three dimensions, as desired.

In many industries; for example, the airplane industry, it is frequently desired to make parts, or shapes of sheets or other material to conform to templates. This has proved to be time-consuming and often lacking in accuracy. It is, therefore, an object of this invention to provide a device for marking, magnetizing, punching, or otherwise affecting a tape or record to represent two dimensional shapes of templates, for instance, or three dimensional objects of any kind. The word "tape" will be used to denote a belt, tape, or record of any suitable type.

Another object is to provide a tracing device, an element of which can be manually guided around the contour of a drawing or template, the device automatically recording on the tape characterizations or changes representing the contour. The tape can then be photoelectrically, magnetically, capacitively, or resistively sensed to control a milling machine or other device for reproducing the contour in any suitable material.

A further object is to provide a tracing device which can be used for scanning or tracing a three dimensional model or object, the device automatically making a tape record to represent the shape of the object in three dimensions.

An additional object is to provide a tracing device which will automatically follow the contour or outline of a drawing, template, or other object and which will make a tape record representing the contour. The record can then be used with an automatic control for causing milling machines or other devices to shape metal or other material to conform to the original contour of the drawing or template, with the desired accuracy.

Another object is to provide novel scanning or following devices and associated circuits.

Other objects will appear in the following description.

Figure 1:
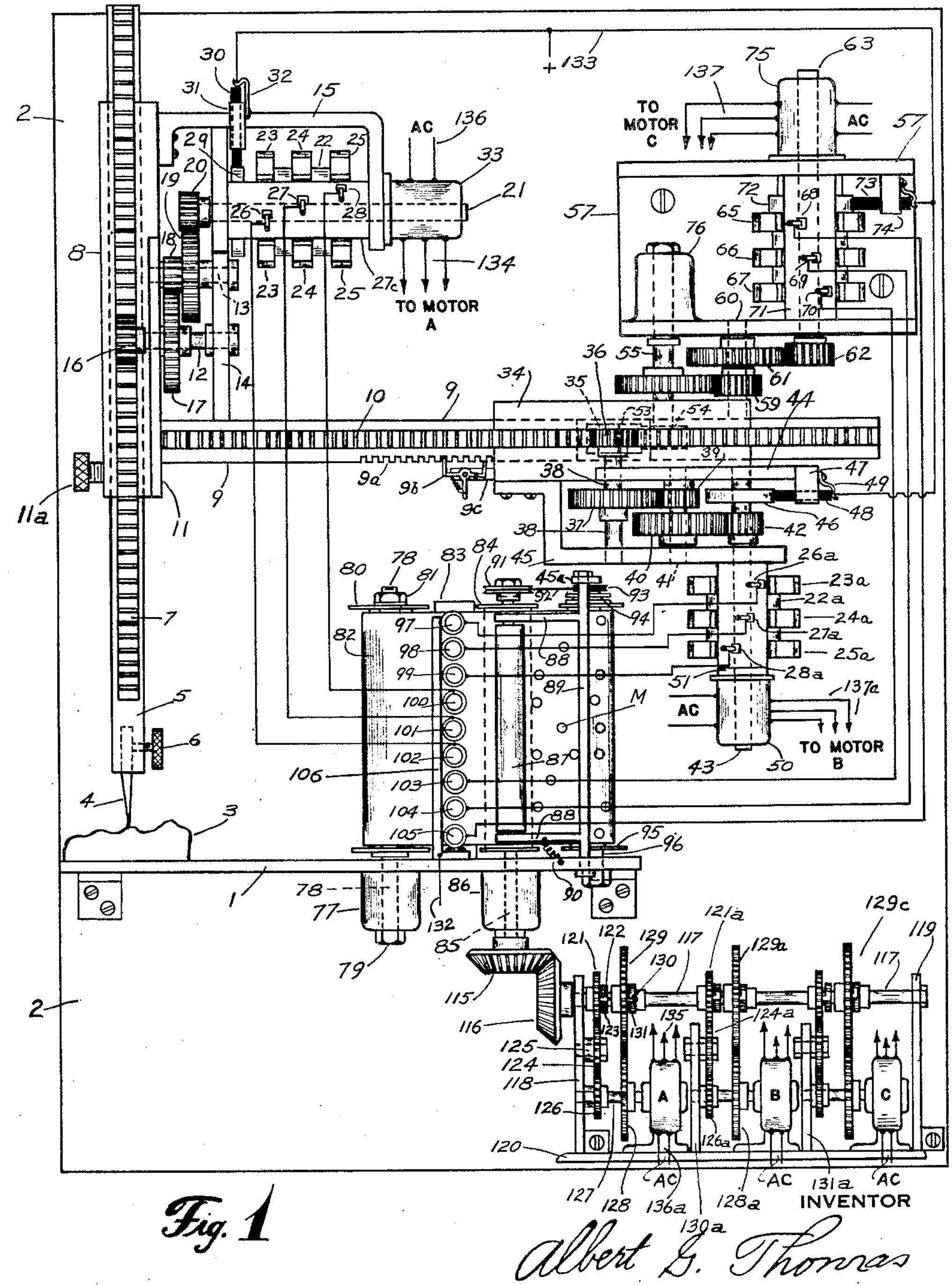
Figure 1 is a front elevation of a device for tracing drawings, templates, or models in two, or in three dimensions, and automatically making a tape record to represent the shape of the drawing or other object.

In Figure 1, shelf 1 is attached at right angles to plate 2 and supports object 3 which is to be traced. This object may be fastened to the shelf which can be in a horizontal or vertical plane as desired. Stylus 4 is clamped in a bore in the end of rectangular bar 5 by means of thumbscrew 6 and rack 7, extending outward from bar 5, is cut integral therewith or attached thereto. As shown, bar 5 is vertically slidable in rectangular guide 8 which has a longitudinal slot through which the rack projects. This slot and the rack are narrower than the rectangular opening through the guide so that the rack and bar can be moved longitudinally through the guide, but will not fall out.

Guide 8 is attached to the end of rectangular bar 9 carrying rack 10 projecting therefrom. This bar is at right angles to bar 5 and guide 8, and the rack 10 extends parallel with bar 9 as indicated. Bearing plate 11 extends from bar 8 and supports shafts 12 and 13 for rotation. The other ends of these shafts are rotatable in bearings in plate 14 attached to bar 9 and bracket 15 which is bolted to guide member 8.

Pinion 16, meshed with rack 7, is attached to the end of shaft 12 which also carries rigidly attached gear 17 which is meshed with pinion 18 which is attached to gear 19. Gears 18 and 19 are fastened to shaft 13, and gear 19 is meshed with pinion 20 fastened to an end of shaft 21 which is rotatable in bearings in plate 14 and bracket 15. This shaft is coaxial with metal sleeve 22 rigidly attached to it and which has integral contacts or commutator segments in three groups, 23, 24, and 25. The space between these segments is filled with suitable insulating material such as Bakelite, porcelain, or the like, and the circular surface of the segments is almost flush with the circular surface of the insulating material so that respective brushes 26, 27, and 28 will ride smoothly over the rotating commutators. The brushes are guided in suitable slots in Bakelite or other insulating block 27c which is attached to plate 14 and bracket 15. Suitable springs are provided to press the brushes against the commutators. The commutator segments 23, 24, and 25 are in line in axial direction, but respective associated brushes 26, 27, and 28 are staggered so that in one direction of rotation of shaft 21 a segment 25 will first come into contact with brush 28, then this segment and brush will separate and a segment 24 will come into contact with brush 27 and, shortly after these separate, a segment 23 will come into contact with brush 26 and after that the same order of circuit connections will occur. The segments are spaced circumferentially so that contact with only one brush at a time will take place. If shaft 21 is rotated in opposite direction, a segment 23 will first touch brush 26, then a segment 24 will come into contact with brush 27 and next a segment 25 will touch brush 28. Slip ring 29 is integral with metal sleeve 22 and makes contact with graphite or other brush 30 which is movable in insulating guide member 31 attached to bracket 15. Spring 32 serves to press the brush against the slip ring and to make electrical connection with the brush.

Motor 33 is coaxial with shaft 21 and is attached to bracket 15, the rotor being carried by the shaft. The motor shaft can, however, be separate from the shaft carrying the commutators, and can be splined or otherwise fastened to the other shaft. Motor 33 is preferably a synchronous or self-synchronous type such as the selsyn.

Due to the stepped-up gear train, it will be seen that a small vertical displacement of stylus 4 and attached rack 7 will cause a relatively large angular rotation of shaft 21 and segments 23, 24, and 25. Any desired ratio can be employed, but in practice a desirable arrangement is that a displacement of stylus 4 of $\frac{1}{1000}$ inch or less will cause the commutators to rotate the segments through an arc at least equal to the arcuate distance between centers of the segments.

Figures 2, 3:
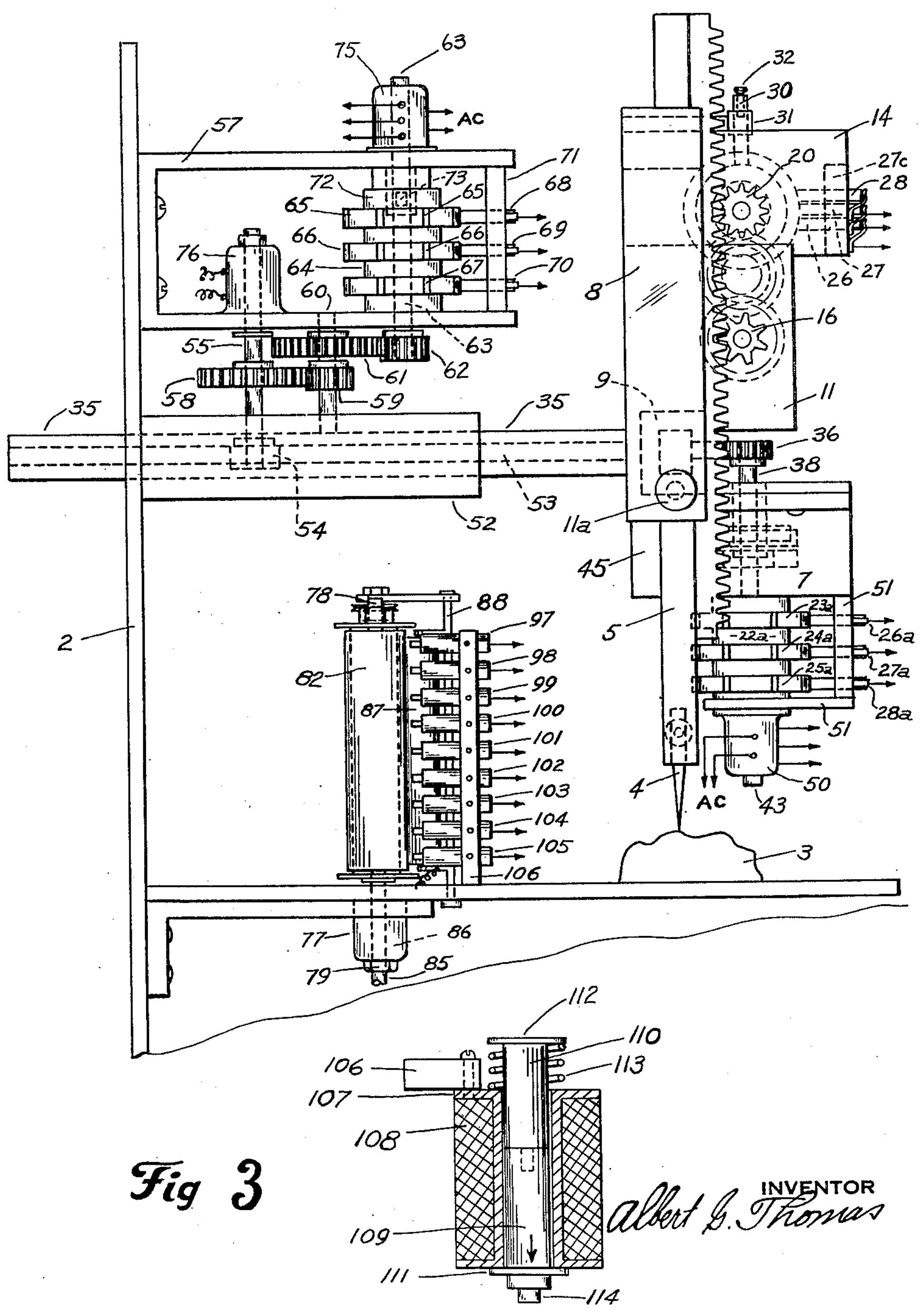
Figure 2 is a side elevation of the device shown in Figure 1.
Figure 3 is a part sectional elevation of a solenoid used in the device of Figure 1 and other modifications.

Bar 9 is horizontally slidable in guide member 34 similar to member 8. Member 34 is attached to the outer end of bar 35 which is movable at right angles to the directions of movement of the bars 5 and 9, as shown in Figure 2. A stepped-up gear train comprising pinion 36 and gear 37 on shaft 38, pinion 39 and gear 40 on shaft 41, and pinion 42 on shaft 43, will by means of a small horizontal displacement of bar 9 and rack 10, through meshed pinion 36, bring about a rotation of commutator segments **23*a*, 24*a*, and 25*a* through at least one segment spacing. These commutator segments are integral with metal sleeve 22*a*, the construction of the commutators and brushes 26*a*, 27*a*, and 28*a* being similar to that described before. Shafts 38 and 41 are rotatable in bearings in plate 44 and bracket 45 attached to guide member 34. Slip ring 46 is attached to shaft 43, being electrically connected with segments 23*a*, 24*a*, and 25*a*. Slotted Bakelite or other insulating block 47 is attached to plate 44 and guides brush 48 which is pressed against slip ring 46 by spring 49. As before, a small displacement of rack 10 relative to guide member 34 will cause a relatively large rotation of the commutator segments, say one space between segments for every $\frac{1}{1000}$ inch of displacement of rack 10 and bar 9. Motor 50 is similar to motor 33 and is attached to insulating member 51 which is fastened to bracket 45 and which supports brushes 26*a*, 27*a*, and 28*a*. The rotor of motor 50 is fastened to shaft 43** to revolve therewith.

As shown, particularly in Figure 2, bar 35 is horizontally slidable in slotted guide post 52 which is fixed at one end to vertical plate 2. While the horizontal and vertical positions are described, it is obvious that the device can be used in different positions. Rack 53 is fastened to bar 35 parallel therewith and projects through a slot in guide post 52. This rack is meshed with pinion 54 which is mounted on shaft 55 which is rotatable in bearings in guide member 52 and bracket 57 which is attached to plate 2. Gear 58, fixed to shaft 55, is meshed with pinion 59 fixed to shaft 60 which also carries larger gear 61 which is meshed with pinion 62. Shaft 60 is rotatable in bearings in bracket 57 and in post 52. Pinion 62 is fastened to shaft 63 which carries coaxial metal cylinder or sleeve 64 from which integral commutator segments or contacts 65, 66, and 67 project. The space between these segments is filled with insulating material to provide a smooth rubbing surface for the respective brushes 68, 69, and 70 which are slidably mounted in slots in ceramic, plastic, or other insulating bar 71 attached to the upper and lower legs of bracket 57. Slip ring 72 is also rotated by shaft 63 and is electrically connected with commutator contact elements 65, 66, and 67. This slip ring is in contact with brush 73 slidably mounted in insulating block 74 attached to the upper plate of bracket 57. Motor 75 is of selsyn type and is similar to motors 21 and 50. The rotor of motor 75 is revolved by shaft 63.

In operation, when stylus 4 is displaced in a direction having a component parallel with the axis of bar 35, rack 53 rotates pinion 54 which, through stepped-up gear train 58—59 and 61—62, causes a relatively great angular rotation of commutators 65—66—67 when bar 35 is moved through guide member 52 for a short distance, say $\frac{1}{1000}$ inch. The gearing can be such that this short movement of the bar will cause the commutators to rotate through any desired angle, such as the angle necessary to move a commutator segment 65 from brush 68 and to bring a segment 66 into contact with brush 69. Booster motor 76 may be connected with shaft 55 or with any other shaft in the system to assist in operating the gear train. This motor may, through a slipping clutch or otherwise, furnish almost enough torque to overcome the friction of the gear train or it may be operated to provide positive movement of the gears. Similarly, booster motors may be used in connection with the other gear trains. Hydraulic or pneumatic boosters may also be used.

Elongated bearing sleeve 77 is attached to shelf or plate 1 and supports shaft 78 which is rigidly clamped between a flange and nut 79 so that the axis of the shaft is parallel with the axis of bar 5; i. e., parallel with the axes of shafts 43 and 63. Spool 80 is rotatable on fixed shaft 78 which has a retaining nut 81. A friction washer may be used to prevent the spool from freely rolling. Belt or tape 82 may be made of any suitable material such as plastic, paper, fabric or the like, and is wrapped around the central sleeve of spool 80. This tape is passed over supporting plate 83 which is fastened to shelf 1 and also passes over drive roller or spool 84 coaxially attached to shaft 85 which is rotated in bearing 86 attached to plate 1, by bevel gear 115. Roller 87 is mounted on a shaft having its ends rotatable in bearings near the ends of arms 88 which are integral with shaft 89. This shaft is rotatable in bearings in bracket **45*a* and plate 1 to which bracket 45*a* is attached. Tension spring 90 is attached to an arm 88 and to plate 1 and yieldingly holds roller 87 against tape or belt 82. Pulley 91 is fastened to shaft 85 by a nut and serves, by means of belt 92, to drive pulley 93 which is coaxially attached to slipping clutch 94 which drives spool 95 around which belt 82 is wound. Spool 95 is rotatable on shaft 96 which is threaded into or is otherwise fastened to plate 1, parallel with shafts 78 and 85**.

Solenoids 97 to 105 inclusive are fastened to bracket 106 which is bolted to plate 1. The axes of the plungers of these solenoids are substantially at right angles to the plane of the belt. The construction of the solenoids is shown in Figure 3. Spool 107, around which the magnetizing coil 108 is wound, is made of brass or other nonmagnetic material. Cylindrical plunger 109 is likewise made of non-magnetic material like brass, and is welded or screwed to soft iron cylindrical plunger or armature 110 which is of the same diameter. Plunger 109 has integral flange 111 which limits movement in direction opposite to that of the arrow. Flange 112, integral with plunger 110 is urged in opposite direction to that of the arrow by compression spring 113 surrounding the plunger. The solenoids may be fastened to bar 106 by screws as indicated. It is obvious that when winding 108 is energized, plunger 110 will be pulled into the central bore in spool 107 so that punch, or printing element 114 attached to the end of plunger 109 will perforate or mark the belt. If element 114 prints, an inked ribbon can be used in connection with it. When winding 108 is de-energized, spring 113 quickly lifts the plungers to the position shown. The action of printing or punching the tape can be so rapid that the belt can be run at reasonable speed, but synchronizing mechanism can be used. If the belt is punched, suitable holes to receive punches 114 would be provided in plate 83. Friction clutch 94 allows spool 95 to be driven at such speed and torque that it will always keep the belt taut as it is wound on the spool.

Miter gear 115 is fastened to shaft 85 and is meshed with similar miter gear 116 fastened to the adjacent end of shaft 117 which is rotatable in bearings in end plates 118 and 119 integral with base plate 120. These plates are bolted to plate 2 by means of suitable brackets. Gear 121 is freely rotatable on shaft 117 and has attached pawl 122 which engages ratchet 123 fixed to shaft 117 when gear 121 is rotated clockwise as viewed from the right, but which slips in opposite direction. It should be understood that this particular ratchet construction need not be used since a ball type over-running clutch or any other suitable ratchet can be used for all the ratchets indicated.

Gear 121 is meshed with idler gear 124 of the same pitch diameter and mounted on a stub shaft screwed into boss 125. Gear 124 is meshed with gear 126 of the same pitch diameter and fixed to motor shaft 127 which extends from motor A and is rotatable in a bearing in plate 118. Gear 128 is fixed to motor shaft 127 and is meshed with gear 129 of the same pitch diameter and floating on shaft 117. Pawl 130 is attached to the right face of gear 129 and engages ratchet wheel 131 fastened to shaft 117, when gear 129 is rotated clockwise as viewed from the right, slipping in opposite direction. Suitable collars are employed to prevent axial shift of the floating gears. Motors A, B, and C are of selsyn or similar type and are mounted on base 120 with their shafts in line.

Gears 121*a*, 124*a*, 126*a*, 129*a*, and 128*a* are identical with the respective gears 121, 124, 126, 129, and 128, and are mounted similarly as indicated. Gears 121*a* and 129*a* carry pawls which are engaged with associated ratchet wheels fixed to shaft 117, for clockwise rotation of these gears. The end of the shaft of motor B and the shaft of gear 124*a* are rotatable in bearings in plate 130*a* rising from base 120. The gear and ratchet system associated with motor C is identical with that associated with motor B, plate 131*a* fixed to base 120 serving as a bearing plate.

One terminal of each solenoid is connected to metal bar 106 which is insulated from plate 1. Conductor 132 is connected to an electrical line or other current source. Either alternating current or direct current can be used to energize the solenoids. The other line 133 of the solenoid current source is connected to brushes 30, 73, and 48. Brushes 26*a*, 27*a*, and 28*a* are electrically connected, respectively, with the other terminals of solenoids 97, 98, and 99. Likewise, brushes 26, 27, and 28 are connected, respectively, with solenoids 102, 101, and 100. Similarly, brushes 68, 69, and 70 are connected, as shown, with respective solenoids 105, 104, and 103. For smoothness of solenoid operation, it is preferable that line 133 be positive, but this is not necessary.

The three conductors 134 from selsyn motor 33 are connected to the three conductors 135 from selsyn motor A. The two conductors 136 of motor 33 and 136*a* of motor A are connected to an alternating current line. These connections are conventional. The three conductors 137*a* from selsyn 50 are similarly connected to the three conductors from selsyn B, the two connections being connected as before to the alternating current line. Likewise, selsyn 75 is similarly connected with selsyn C. The connections may be as desired, but preferably should correspond to some desired mode of displacement of stylus 4. For instance, the connections may be such that motors A, B, and C will rotate in the same direction if stylus 4 and associated racks are moved upward from plate 1, outward from plate 2, and to the right as viewed in Figure 1.

It will be seen that motor A will drive shaft 117 and miter gear 116 in the same direction regardless of the direction of rotation of motor A. If, for instance, the motor is viewed from the right, and is rotating in counterclockwise direction, gear 129 will be rotated in clockwise direction and pawl 130 will engage ratchet wheel 131 to rotate shaft 117 clockwise. If, on the other hand, motor A is rotating clockwise, gear 129 will be rotated counterclockwise, and pawl 130 will slip on ratchet wheel 131; but gear 126, through the agency of idler gear 124, will rotate gear 121 clockwise at the same speed as that of motor shaft 127, and pawl 122 will engage ratchet wheel 123 to drive shaft 117 in clockwise direction. When pawl 130 is driving, pawl 122 slips, and vice versa. The construction and operation of the gear units 129*a* and 129*c*, associated with motors B and C, respectively, are similar to the gear assembly for motor A. Therefore, motor B, or motor C, will drive shaft 117 in clockwise direction, viewed from the right, regardless of the direction of rotation of the motors. It should be understood that any suitable type of one-way engaging means, as over-running clutches, may be used in place of the ratchets and pawls indicated. It is obvious that, due to the ratchet mechanism, shaft 117 will be driven at the speed of the motor which is rotating fastest.

In operation, belt 82, made of paper, plastic, or any suitable material, is wound on spool 80 and is attached to spool 95. The belt passes between flanged drive roller 84 and shorter roller 87 which is urged against the belt by spring 90. Friction washers or the like provide moderate resistance to rotation of spool 80. The model or object 3 is placed upon shelf 1, being fastened preferably, and is traced by stylus 4 according to some pattern, as for instance, in parallel paths, spirally, or otherwise. The separation of the parallel paths can be determined by a template, gauges, screw adjustment, or in any way desired. Likewise, if a spiral or other tracing is employed, a suitable gauge can be used. Whatever scanning or tracing pattern is followed, the point of stylus 4 is always held in contact with model 3 and displacements of bar 5 and rack 7 relative to pinion 16 will cause commutator contacts 23, 24, and 25 to touch respective brushes 26, 27, and 28, in sequence, so that solenoids 100, 101, and 102 will be energized in sequence. If the gearing is such that $\frac{1}{1000}$ inch vertical displacement of stylus 4 causes an arcuate movement of the contacts 23—24—25 equal to the circumferential spacing between the contacts, then a solenoid will be energized each time stylus 4 moves up or down $\frac{1}{1000}$ inch. It will be observed that the three solenoids 100, 101, and 102 are energized in one order for downward movement of stylus 4 and in reverse order for upward movement. The tape marks or holes M, printed or punched by the solenoid plungers, are inclined upward to the right, indicating that stylus 4 was lowered. Had the stylus been raised, the line of marks would have sloped upward to the left; i. e., solenoid 102 would have been energized first, then solenoid 101, and then solenoid 100.

As viewed (Figure 1), the belt is driven from left to right, belt 92 driving slip clutch 94 to insure that the belt is wrapped tightly around spool 95. As shaft 21, carrying the commutator, is rotated, the rotor of selsyn motor 33 is rotated in proportion and, accordingly, connected selsyn A is likewise rotated proportionally. The direction of rotation of selsyn A reverses when shaft 21 and the rotor of selsyn 33 are reversed in direction, but belt 82 is moved from left to right regardless of the direction of movement of stylus 4 and regardless of the direction of rotation of selsyn A, by mechanism already described. It will be observed, however, that the extent of movement of belt 82 is proportional to the extent of vertical displacement of stylus 4 and connected shaft 21. If desired, a booster motor or other electrical, pneumatic, or hydraulic booster can be included in the gear system in order to reduce the force necessary to move the stylus. Similarly, other boosters could be included in the other two rack or gear systems. These boosters could comprise motors with slipping clutches, pistons and cylinders, solenoids, or the equivalent and might be automatically operated or manually controlled.

Displacement of stylus 4 and rack 10 to the right or left rotates pinion 36 with the result that commutator bars 23*a*, 24*a* and 25*a* are rotated with respect to brushes 26*a*, 27*a*, and 28*a* and so associated solenoids 97, 98, and 99 are sequentially energized to punch or print belt 82 with three rows of marks similar to marks or holes M. The order of energization of the solenoids depends upon the right or left movement of the stylus. Shaft 43, carrying commutator contacts 23*a*, 24*a*, and 25*a* and the rotor of selsyn 50, will control the direction and rate of rotation of connected selsyn B which also drives belt 82 from left to right, regardless of the direction of rotation of selsyn B.

Displacement of stylus 4 forward or rearward, with respect to the observer (Figure 1) will cause shift of bar 35 and rack 53 (Figure 2) to cause rotation of pinion 54 and commutator contacts or bars 65, 66, 67, and also selsyn 75 which is connected to selsyn C. Therefore, the associated solenoids 103, 104, and 105 will be energized in order, so that a third group of three lines of marks or holes will be made in tape or belt 82. As before, the order of energization of the solenoids will depend upon the direction of displacement of stylus 4 and rack 53. Selsyn C will likewise drive belt 82 from left to right (Figure 1) regardless of the direction of rotation of connected selsyn 75. It is obvious that the most rapidly rotating motor of the three selsyns A, B, or C will do the driving of shaft 117 and the belt since the ratchets associated with the slower motors will slip. It is also evident that belt 82 will be moved past the solenoids at a rate proportional to the fastest displacement of the stylus along one of the three mutually perpendicular axes. The belt, therefore, moves only when the stylus is being displaced and at a rate proportional to the fastest rate of movement of the stylus parallel to one of the three axes. The belt could, of course, be driven at constant or variable speed, otherwise; but the arrangement described is preferable.

The printing or punching of the belt by the solenoid members can be made quite rapid so that movement of the belt is not materially hindered. If, however, the commutators are geared to pass the brushes rather slowly, a quick action of the solenoids can be obtained by charging condensers and causing the commutators to close the circuits from the condensers to the solenoids. Likewise, the commutators can be arranged to close circuits controlling one revolution clutches or other devices providing quick cyclic action.

Grooves or notches 9*a* in the bottom edge of bar 9 may be used in conjunction with cooperating escapement 9*b*, which is pivoted to arm 9*c* extending from guide 34, to shift bar 9 one space at a time, for tracing models in parallel paths.

This tape or belt marking or punching device is shown as used in tracing a three-dimensional model. It is obvious that the device can also be used as a two-dimensional tracer so that the stylus can be traced around outlines, drawings, or two-dimensional patterns of any kind. If desired, thumbscrew 11*a*, threaded into a hole in guide member 8, can be tightened to prevent vertical change of position of stylus 4 when tracing in two dimensions.

The tracing or belt marking or punching device described will, therefore, produce a belt with characteristics corresponding very closely to the original drawing, pattern, or model traced, whether in two or three dimensions. This belt can then be used in connection with automatic reproducing or control devices as described in my copending application, Serial No. 295,694, filed June 20, 1952, or for other purposes.

Figure 4:
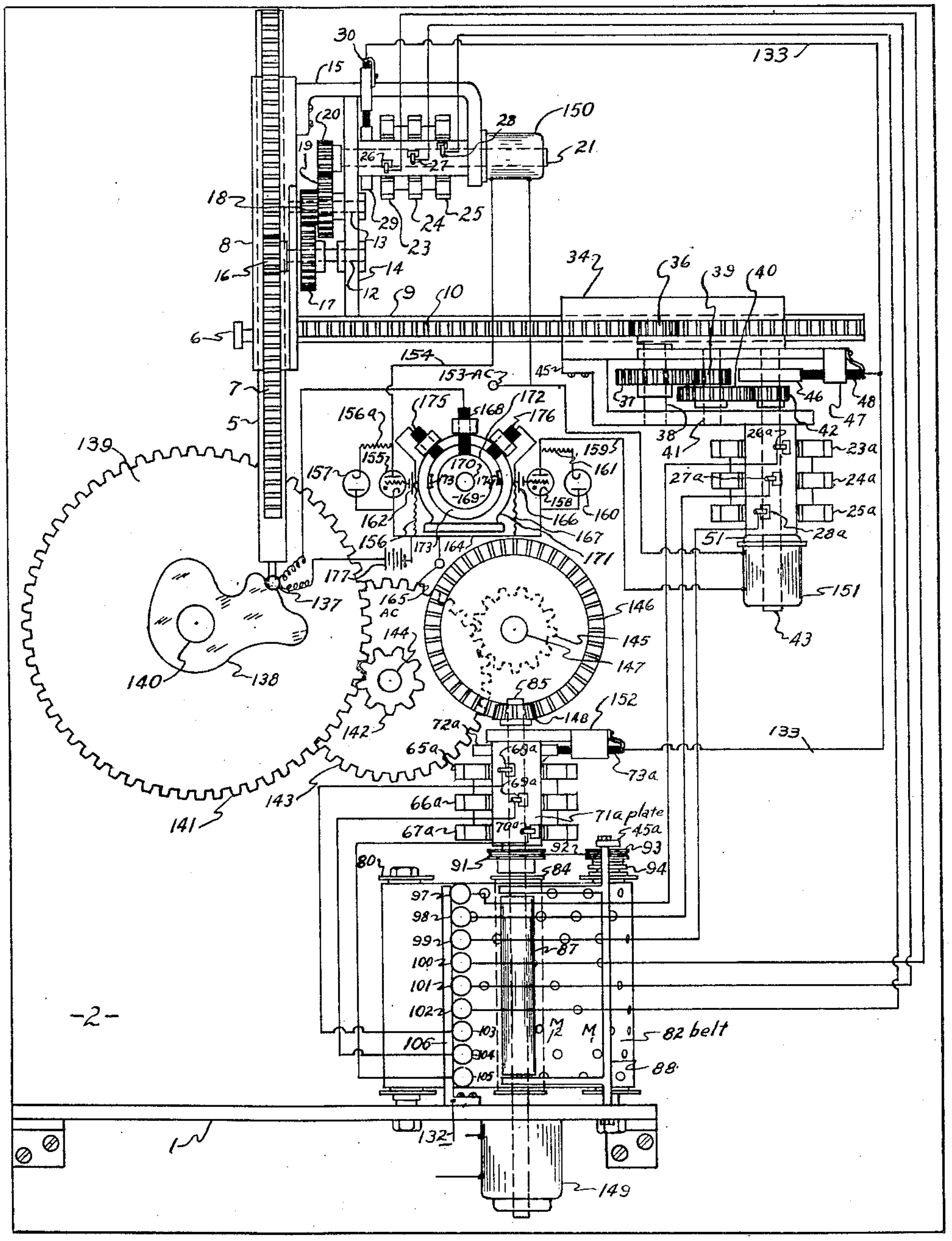
Figure 4 is a plan view, or elevation, of a device for automatically tracing a drawing or template and automatically marking or punching a tape which can be used in a control device for reproducing the shape of the drawing or template. The turntable holding the template can be used in a horizontal or vertical plane as desired.

In Figure 4, the belt mechanism, the racks and associated gearing, and the brushes and commutators are similar in construction to that shown in Figures 1 and 2, like parts being designated by like numerals. In this modification of the invention, stylus 4 is replaced by photoelectric scanning unit 137 which is attached to the end of bar 5. This photocell unit serves to actuate an electrical circuit according to whether it is in register with the dark template or drawing 138 or whether it receives a greater amount of light from a light-hued area of turntable 139 outside the template. The template can, of course, be of light tone and the surrounding area can be dark, or the template can comprise a broad dark line. This template can be a drawing, or it can be made of a sheet of opaque material such as metal, or otherwise. Details of unit 137 will be described later.

Turntable 139 is rotatable about stub shaft or other pivot 140 fastened to plate 2 which may be in a horizontal or vertical plane, as desired. The rim of turntable 139 is provided with gear teeth 141 which are meshed with pinion 142 coaxially attached to larger gear 143 which is rotatable around stub shaft 144 fastened to plate 2. Gear 143 is meshed with pinion 145 which is coaxially attached to bevel gear 146 which is rotatable on stub shaft 147 extending from plate 2. Gear 146 is meshed with bevel pinion 148 attached to belt drive shaft 85 which is preferably rotated at relatively low speed by means of a geared motor 149 or other reduced speed drive. The speed of movement of belt 82 may be a few feet per minute, or faster. Motor 149 may be of synchronous type in order to provide uniform speed, and the belt will be driven from left to right as before. Motor 149 may be attached to shelf 1.

Direct current motor 150 is attached to bracket 15 and drives shaft 21 carrying commutators 23—24—25. Similarly, direct current motor 151 is attached to plate or bracket 51 and drives shaft 43 carrying commutators 23*a*—24*a*—25*a*. These two commutator units are electrically connected with the solenoids 97—98—99 and 100—101—102 in the same general manner as indicated in Figure 1. The commutator unit 65*a*—66*a*—67*a* and associated brushes 68*a*—69*a*—70*a* together with slip ring 72*a* and brush 73*a* are constructed in similar manner to the other commutator units, and insulating plate 71*a* supporting the brushes is fastened to bracket 152 attached to plate 2. This bracket also holds a bearing for shaft 85 carrying bevel pinion 148. The other end of shaft 85 is rotatable in a bearing in plate 1.

Brushes 68*a*, 69*a*, and 70*a* are electrically connected with respective solenoids 103, 104, and 105. Slip rings 29, 46, and 72*a* are connected to positive line 133 and to the various commutator segments as described in connection with Figure 1.

One terminal of direct current motor 150 is connected to alternating current terminal 153. The other terminal of this motor is connected by conductor 154 to the anode of thyratron 155 and to the cathode of rectifier tube or other rectifier 157 through series resistor 156*a* which limits current through tube 157. Due to dropping resistor 156*a*, the current passed through rectifier tube 157 during alternating current half cycles in one direction will be less than the current passed through thyratron 155 during alternating current half cycles in opposite direction. Therefore, the excess of current passed by thyratron 155, when conducting, as compared to the current passing through rectifier 157 will bias motor 150 to rotate in opposite direction to that as determined by current flow through the rectifier when the thyratron is not conducting current.

Similarly, alternating current terminal 153 is connected with one terminal of direct current motor 151, the other terminal of which is connected to the anode of thyratron 158 and to the cathode of rectifier 160 through resistor 161, by means of conductor 159. As before, thyratron 158 passes sufficient current during half cycles in one direction to overwhelm the effects of current passed by the rectifier 160 during half cycles in opposite direction. Therefore, when the rectifier alone is conducting, motor 151 will rotate in one direction, and when both the thyratron and rectifier are conducting opposite half cycles, motor 151 will revolve in opposite direction.

The grid of thyratron 155 is biased negatively by means of battery or other potential source 162 connected to the cathode of the thyratron through resistor 156. The anode of rectifier 157 is connected to the cathode of thyratron 155 and conductor 164 connects the cathode of the thyratron to alternating current terminal 165. Similarly, battery or other bias source 166 is connected in series with resistor 167, between conductor 164 and the grid of thyratron 158, biasing this grid negatively with respect to the associated cathode. The cathode of the photocell of unit 137 is connected to brush 168 in contact with slip ring 169 driven by shaft 170 of motor 171 which may be of any suitable type such as a synchronous motor, for instance. This brush and the other two shown are mounted in suitable insulating blocks or brackets attached to the motor. Commutator disc 172 is driven by shaft 170 and is largely of Bakelite or other insulating material, but has metal contact elements 173 and 174 flush with the curved surface and diametrically opposite. These contacts are electrically connected with slip ring 169. Brush 175 is connected with the positive terminal of bias source 162 and brush 176 is connected with the positive terminal of bias source 166. The positive terminal of battery or other direct current potential source 177 is connected to the anode of the photocell of unit 137, and the negative terminal of source 177 is connected to conductor 164. The source 177 should have a potential of approximately 90 volts for gas type phototubes and as high as 1100 volts for multiplier type phototubes. The latter type is preferable on account of its sensitivity. The spacing of brushes 175 and 176 is less than the circumferential spacing of contacts 173 and 174.

In operation, template or drawing 138 is suitably attached to turntable 139, and motor 149 is connected to power lines so that it revolves the turntable slowly, through the reduction gearing shown. At the same time, the motor revolves feed roller 84, and take-up reel 95, thereby causing belt 82 to pass from left to right under the solenoid-operated printing or punching elements described previously. The speed of rotation of the turntable and the rate of movement of the belt are optional, but should be chosen to suit conditions. These speeds can be varied by changing the rate of rotation of motor 149. For example, the turntable can be rotated at a speed of one or more revolutions per minute, and the belt can be moved at a speed of from four to twelve feet per minute. These are not limiting speeds, however.

Motor 171 is energized simultaneously with motor 149, or otherwise, and revolves commutator 172 at a rapid rate, say at a few thousand R. P. M. to cause brush 175 to be electrically connected with one of the commutator contacts 173 or 174, and then the same contact is brought into contact with brush 176, or vice versa, depending upon the direction of rotation of the commutator. A larger number of commutator contacts can be used if desired. It will be seen that the rotating commutator causes current from the cathode of the photocell to pass first through resistor 156 biasing the grid of thyratron 155 positively to fire it, and then through resistor 167 to bias the grid of thyratron 158 positively to fire it. The grids of these thyratrons are normally biased negatively to prevent current conduction through the thyratrons.

The rate of switching the current from one motor control to the other should preferably be not faster than the time period of one complete cycle of the alternating current which can have a frequency of 60 cycles, 400 cycles, or higher. It is actually desirable that several cycles of current be applied to motor 150 before switching the control to motor 151, or vice versa. It is obvious that thyratrons 155 and 158 will be extinguished when the cathodes of the thyratrons are made positive with respect to the anodes. The rectifiers then pass current. The thyratrons will be fired on each half cycle in which their anodes are positive, provided that the photocell unit 137 receives sufficient illumination.

Motor 150 is connected so that it causes extension of bar 5 out of guide 8 when thyratron 155 is fired; i. e., when photocell unit 137 receives sufficient light. Therefore, bar 5 will carry the photocell toward template 138 until the dark area of the drawing or template 138 reduces the light sufficiently to extinguish thyratron 155, and then the effective opposite half cycles of current through rectifier 157 will cause motor 150 to reverse, thus retracting the photocell until sufficient light from turntable 139 or the drawing is encountered to fire the thyratron again. Therefor, the photocell and bar 5 will be caused to oscillate back and forth through a very small displacement so that in effect the photocell is maintained in register with the template edge, in a vertical axis, as viewed, as the template is rotated by the turntable. The photocell scanning device can be made very sensitive to provide great accuracy.

Motor 151 is connected in such manner that illumination of the photocell unit 137 sufficient to fire thyratron 158 will cause motor 151 to drive bar 9 and the photocell to the left along a horizontal axis until the photocell reaches the dark area of the template. Then the light will be reduced sufficiently to extinguish thyratron 158, and current passing in opposite direction through rectifier 160 will cause motor 151 to reverse, thereby moving bar 9 and photocell unit 137 to the right until sufficient light reaches the photocell to cause firing of thyratron 158. The photocell will, therefore, be made to follow closely variations of the template edge along a horizontal axis, as the template is rotated. Since the two motors 150 and 151 are alternately controlled by the photocell, at a rapid rate, the photocell will be made to follow all variations of the template outline, along the two axes. The speed of response of the motors can be made proportional to the rate of rotation of turntable 139. The rate of movement of the photocell along each axis can be the same, or different, as desired. The rate can be automatically varied according to the amount of light reaching the photocell or according to the distance of the photocell axis from the template edge.

The rotation of shaft 85 by motor 149 causes commutators 65*a*, 66*a*, and 67*a* to be brought into contact consecutively with brushes 68*a*, 69*a*, and 70*a*, with the result that, for clockwise rotation of the commutators as seen along shaft 85 looking toward gear 148, solenoid 103 will first be energized, then solenoid 104, and finally solenoid 105, and then the cycle is repeated. When shaft 85 and the commutators are rotated in opposite direction, these three solenoids will be energized in reverse order. Clockwise rotation will cause the solenoid devices to print or punch marks $M_1$ and reverse rotation will produce marks $M_2$, the slopes of the marks being in opposite sense, as indicated.

Commutators 23, 24, and 25 are connected through respective brushes 26, 27, and 28 to solenoids 100, 101, and 102, in order. Therefore, the solenoids will cause marks similar to marks $M_1$ and $M_2$ to be printed or punched in the belt, in line with the solenoids, the slope of the marks depending upon the direction of rotation of the commutators and the longitudinal distance of separation of the marks being inversely proportional to the rate of rotation of shaft 21, which rate is also proportional to the rate of displacement of bar 5 in vertical direction, as considered with respect to the axes.

In like manner, rotation of shaft 43 will, through the associated gearing and rack 10, cause proportional horizontal movement of bar 9 and photocell unit 137 along the X-axis, and commutators 23*a*, 24*a*, and 25*a* will be rotated past respective brushes 26*a*, 27*a*, and 28*a* at a rate depending upon the rate of rotation of shaft 43. The rotation of these commutators past the brushes causes connected solenoids 97, 98, and 99 to become energized in turn so that three lines of marks will be printed or punched in the moving tape or belt. Again, the slope of lines drawn through these marks crosswise of the belt at an angle will depend upon the direction of rotation of shaft 43 carrying the commutators, and the spacing of the marks longitudinally will be inversely proportional to the speed of this shaft.

It will be seen, therefore, that marks will be made upon the belt to represent the direction and speed of rotation of turntable 139. The direction and speed of movement of rack 7 and bar 5 relative to guide member 8, and the speed and direction of movement of rack 10 and bar 9 will be represented by six lines of marks on the belt. Now if this punched or marked belt is placed in an automatic control similar to that described in my copending application, Serial No. 295,694, filed June 20, 1952, then a plate or other material can be automatically shaped in accordance with the original drawing or template.

In this way various shapes, in metal or other material, or other devices or parts can be cut out automatically under control of a tape which is made automatically to correspond to a template or drawing. The accuracy can be predetermined by choosing one commutator spacing to represent 1/1000 inch movement of the tracer, or greater accuracy if desired. Then one mark on the tape will correspond to an equivalent displacement of the cutting tool. The mechanism can be arranged, through gearing and other components, so that one step movement of the motor will displace the cutting tool 1/1000 inch or 1/10,000 inch, as desired, or to any other practicable degree.

Figure 5:
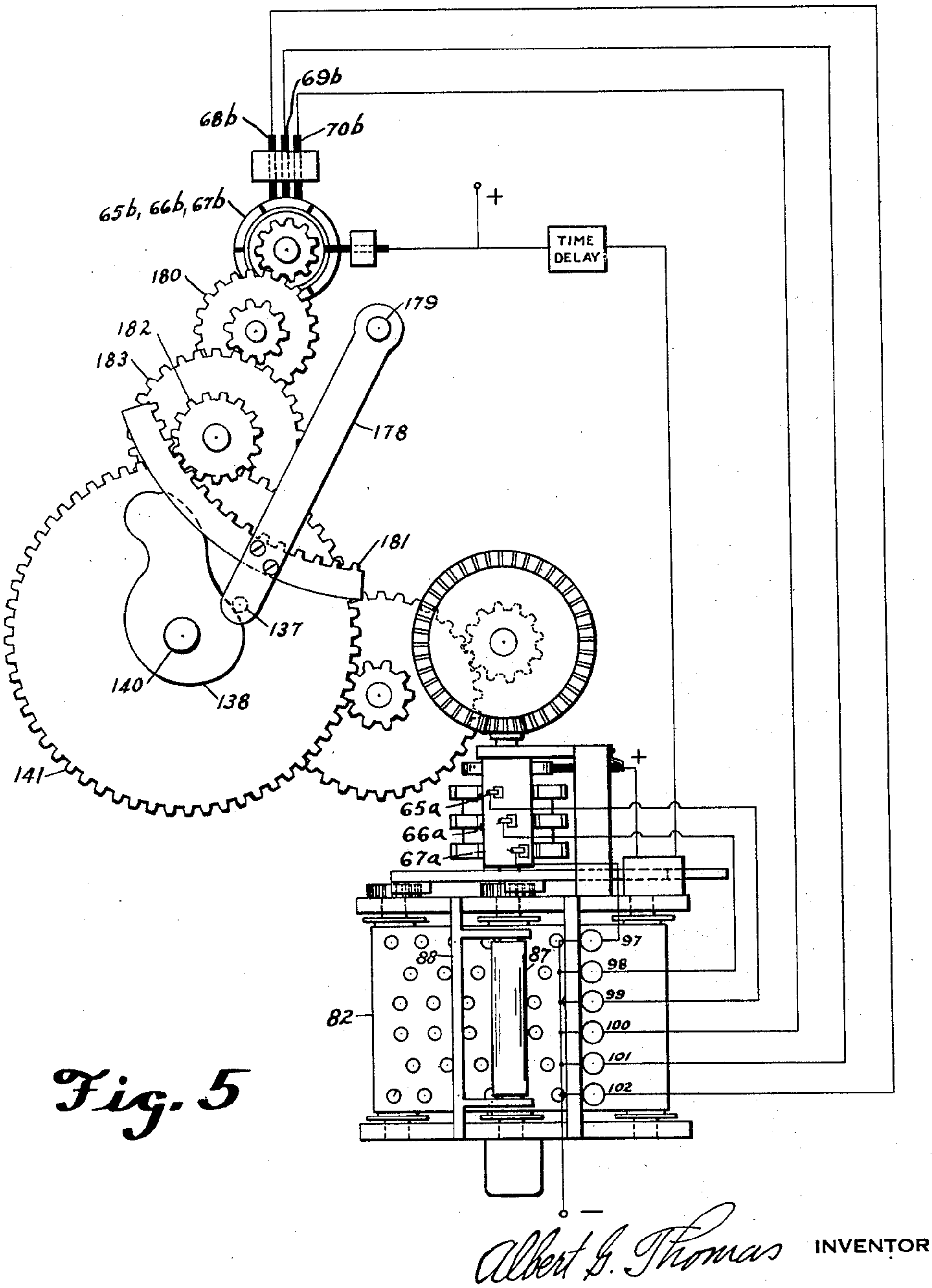
Figure 5 is a plan view of a device for making a marked or punched tape to represent the shape of a template or drawing, the tape being usable for automatically reproducing the shape of the template or drawing. In this modification of the invention the tracing member is pivoted to move in a circular path rather than along straight line coordinate axes as before.

Figure 5 shows another arrangement of scanning mechanism in which the stylus or photocell is mounted on a pivoted arm 178 which is movable through an arc concentric with pivot 179 fastened to plate 2. Rack 181 is concentric with pivot 179 and is attached to arm 178. This rack drives pinion 182 which, through attached gear 183 and associated step-up gearing, drives commutator unit **65*b*—66*b*—67*b*. As before, conductors leading from similar commutator brushes 68*b*—69*b*—70*b* are connected with solenoids 100, 101, and 102. The remaining connections are as indicated. The arc through which stylus 137 swings may, if desired, intersect pivot 140. As arm 178 swings in one direction or the other, rack 181 causes commutator unit 65*b*—66*b*—67*b* to rotate through a much larger angle than that of the arm, and so solenoids 100, 101, and 102 are energized in sequence, to represent small angular displacements of the arm. Likewise, small angular rotations of turntable 139 cause relatively large rotation of commutator unit 65*a*—66*a*—67*a* as in Figure 4. Belt 82 is, therefore, marked or punched according to the degree of rotation of turntable 139 and according to sweep of stylus or photocell unit 137 about pivot 179. In order to reach all indentations or recesses in the pattern 138, or to reproduce intricate shapes automatically, the belt can be marked by rotating the turntable one complete revolution in one direction and then one complete revolution in opposite direction. This method is also desirable for some shapes if element 137** is a photocell instead of a stylus, so that the template is traced automatically.

Figure 6:
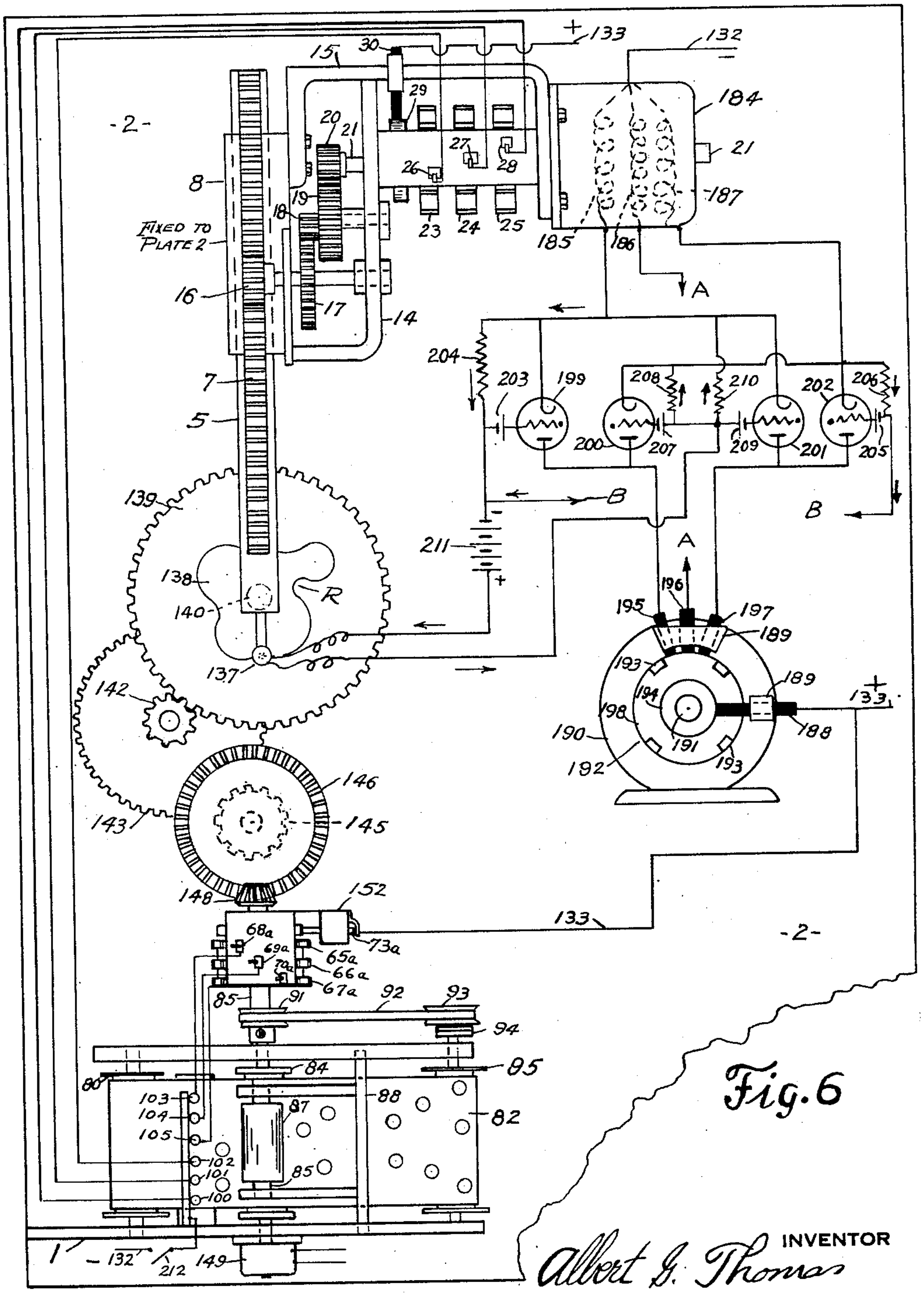
Figure 6 is a plan view, or elevation, as desired, of a modification of the invention, in which special step motors which I have devised are used to provide an accurate automatic tape maker which marks or punches a tape to correspond to the shape of a drawing or template.

In Figure 6, like parts are given like numerals as before. Turntable 139 holding drawing or template 138 is rotated by means of motor 149, shaft 85, and connecting gear train 148—146—145—143—142, as previously described. Rotation of shaft 85 also rotates commutator unit **65*a*—66*a*—67*a* so that solenoids 103, 104, and 105, connected as shown, will be energized in turn and in the order determined by the direction of rotation of shaft 85**.

The rack 7 carrying photocell assembly 137 is arranged as shown in Figure 1 or Figure 2, and is driven preferably along a radius of turntable 139 by step motor

184 which is constructed as described in my co-pending application, Serial No. 295,694, filed June 20, 1952. This is energized in pulses or intermittently to cause it to rotate through predetermined angular displacements or steps, and the rotor stops if the intermittent energization is stopped. Definite and precise movements of rack 7 and attached photocell unit 137 are, therefore, possible with this motor. Through step-down gear train 20—19—18—17—16 and rack 7, relatively large angular movements of motor 184 will cause relatively small displacements of photocell unit 137 in one direction or the opposite along a radius of turntable 139. One step movement of the motor can cause the photocell unit to be displaced 1/1000 inch or less if desired.

The motor 184 has three wound stator sections and three out-of-phase rotor sections. The motor can be reversed by transposing the connections of the first and third phases of the wound stator. An electronic tube circuit is shown for providing this reversal, but relays can be used, of course. The negative line 132 is connected to the junction of the three stator windings 185, 186, and 187, and positive line 133 is connected to brush 188 mounted in insulating member 189 attached to the frame of motor 190 which has shaft 191 to which is fastened commutator 192 having contact elements 193 electrically connected with slip ring 194 which is in contact with brush 188 to which positive line 133 is connected. Brushes 195, 196, and 197 are slidably supported by element 189 and are in contact with commutator 192 comprising the contacts 193 and insulating material 198 therebetween. The brushes 195, 196, and 197 are circumferentially spaced so that as one of the contacts 193 leaves, say, brush 197, for clockwise rotation of the commutator, the next succeeding contact 193 is near brush 195 and will touch this brush soon after the forward contact leaves brush 197. Brush 195 is electrically connected with the anodes of thyratrons 199 and 200, and brush 197 is electrically connected with the anodes of thyratrons 201 and 202. The cathodes of thyratrons 199 and 201 are connected to the remaining end of winding 185, and the cathodes of thyratrons 200 and 202 are connected with the remaining end of winding 187. The remaining end of winding 186 is connected with brush 196 as indicated by arrows A—A.

Battery or other voltage source 203 connects the grid of thyratron 199 with the cathode of that tube through resistor 204, biasing this grid positively with respect to the cathode. The grid of tube 202 is similarly biased positively by means of potential source 205 and connected resistor 206. The grid of thyratron 200 is biased negatively by potential source 207 connected to the cathode of tube 200 through resistor 208. Likewise, potential source 209 biases the grid of thyratron 201 negatively through resistor 210 connected with the cathode of that tube. The positive terminals of sources 207 and 209 are connected together and to the cathode of the photocell of unit 137 which may have a sensitive multiplier type photocell, or the amplified output of a photocell may be connected with the junction of sources 207 and 209. The anode of the photocell of unit 137 is connected to the positive terminal of battery or other potential source 211, the negative terminal of which is connected to the end of resistor 204 connected with potential source 203. The potential of source 211 is sufficient to overcome or exceed the potential of any of the bias sources 203, 207, 209, or 205. Brushes 26, 27 and 28 are electrically connected to solenoids 102, 101, and 100 as indicated, but in this case these solenoids are shown in reverse order and are placed below solenoids 103, 104, and 105 for convenience in illustrating the wiring. Brushes **68*a*, 69*a*, 70*a* are connected to terminals of solenoids 103, 104, 105. The remaining terminals of the solenoids are electrically connected to negative line 132 through solenoid-supporting bar 106 which may be insulated from plate 1**.

In operation, drawing or template 138 is placed on turntable 139 and may be fastened to it by screws, clips, current, vacuum action, or otherwise. Then motor 190 is energized to cause intermittent current to be supplied to step motor windings 185, 186, and 187, in order, the currents passing through brushes 195, 196, and 197. This causes motor 184 to revolve in a direction depending upon whether or not photocell unit 137 is receiving light. This unit will be described later, and comprises a combined photocell and light source. Assuming that template 138 is opaque, the electrical components are connected so that step motor 184, rack 7, and photocell unit 137 will be moved toward plate 1 when the photocell is in relative darkness, and in the reverse direction when the photocell is illuminated by light passed around the edge of the template or reflected from the lighter hued border thereof.

The electrical connections are made so that normally, with the photocell in darkness, the grids of thyratrons 199 and 202 are maintained positive with respect to their cathodes, by bias sources 203 and 205, so that these thyratrons conduct current to respective field windings 185 and 187 when a commutator contact 193 touches brushes 195 and 196 and then brush 197. Brush 196 supplies energy to field winding 186 each time an element 193 is brought into contact with brush 196, regardless of the illumination of the photocell. Now, with thyratrons 199 and 202 maintained in conductive state, bias sources 207 and 209 will simultaneously hold thyratrons 200 and 201 negatively biased or in non-conductive condition. Therefore, the commutator will supply energy to field windings 185, 186, and 187 in that order, through thyratron 199, connections A—A, and thyratron 202, respectively. Then motor 184 will revolve in steps, until the photocell unit 137 is moved in the direction of plate 1 sufficiently for the photocell to receive light at the template edge. When this happens, current from source 211 passes through the circuit in the direction of the arrows, biasing the grids of thyratrons 199 and 202 negatively to the point of cut-off, and simultaneously biasing the grids of thyratrons 200 and 201 sufficiently positive to cause these tubes to conduct current when supplied by the commutator. In effect, this switches the connection of brush 197 from winding 187 to winding 185, and simultaneously switches the connection of brush 195 from winding 185 to winding 187. This reversal of the order of energization of the field windings causes motor 184 to reverse, with the result that the photocell unit 137 is moved away from plate 1 until the photocell is again in darkness, at which time the original electrical conditions are restored and motor 184 again reverses. It will be seen, therefore, that as turntable 139 rotates the template, the photocell unit will be made automatically to follow closely the outline of the template by a rapid series of reversals of direction of step motor 184. Bar 5 is preferably in line with pivot 140. A marked advantage of this step motor is that it will not overtravel, but may be magnetically locked in position, and may be quickly reversed. If desired, the circumferential width of commutator contacts 193 and the spacing of these contacts and the brushes may be such that one field winding is held energized until the next succeeding field winding is energized. In this way, motor 184 is always magnetically controlled so that it will not drift or over-travel. I have found that this motor is highly reliable for accuracy.

Commutator 192–193 may be rotated at a very rapid rate, but should not be so fast that motor 184 will not satisfactorily respond to the intermittent pulses of current. The steps can be so chosen that one step movement of the motor represents any desired displacement of the photocell unit.

Commutator 192–193 can be replaced by a thyratron circuit or other electronic components, and thyratrons 199, 200, 201, and 202 may be replaced by relays.

After photocell unit 137 is brought into register with the outline of template 138, or before, switch 212 in negative line 132 is closed so that the solenoids 103, 104, and 105, and 100, 101, and 102 are energized in the order as determined by the direction of rotation of commutators 65*a*—66*a*—67*a* and 23—24—25, the frequency of energization of the solenoids being proportional to the rates of rotation or movement of the commutators. Belt 82 is, therefore, marked or punched with six lines of indications, three lines representing the direction and speed of rotation of shaft 85 and consequently of turntable 139, and three lines representing the direction and speed of angular displacement of shaft 21 and consequently of photocell unit 137. The speed of movement is inversely proportional to the longitudinal spacing of the marks on the belt, and the direction of displacement is represented by the slope of consecutive marks, considering three associated rows.

If all parts of the outline of a template cannot be reached by a radially displaced scanning unit 137, such as recesses like R as shown, the turntable can be rotated through one revolution by motor 149 and then this motor can be reversed to rotate the turntable one revolution in opposite direction. In any case, the tape or belt 82 will be marked to represent the relative movements of the turntable and scanning unit 137. The marked tape can then be used to reproduce the shape of the template automatically.

Figure 7:
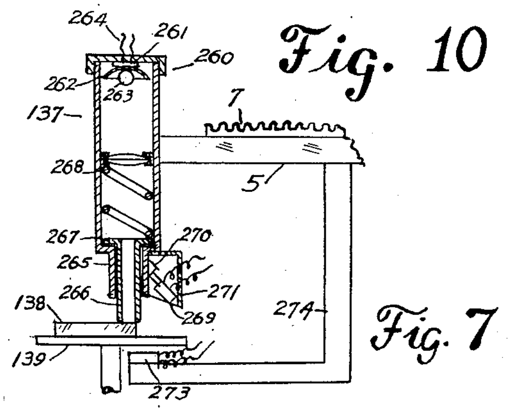
Figure 7 is a part sectional elevation of a photocell and lamp scanning unit for use in the automatic tracing devices shown in Figures 4 and 6 or in other modifications of the invention, or for other purposes.

Figure 7 shows one type of construction of the photocell unit 137 which includes a lamp. Cylindrical or other type housing 259 is fastened to the end of bar 5, and has screw top 260 which may have ventilating holes. Lamp base or socket 261 is attached to the inner surface of top 260 and carries reflector 262. Lamp 263 is held in the socket and insulated electrical conductors 264 may be connected to a source of current to cause the lamp to emit brilliant light. This lamp may be a projection type lamp or otherwise. Housing 259 has lower portion 265 having an axial bore in which tube 266 is vertically slidable as indicated. Flange 267 of tube 266 serves the double purpose of blocking light from entering the space between tube 266 and housing 265 and also to limit downward movement of the tube which may be urged by compression spring 268 to cause the tube to be pressed gently against template 138 which may be of opaque material, or member 138 may be an opaque drawing having a clear border. Tube 266 may be allowed to fall by gravity if turntable 139 is in a horizontal plane.

The lower outer edge of tube 266 is preferably beveled, or rounded so that the tube will slide easily over the template. The tube is preferably accurately ground to the same diameter as that of the cutting tool which will be used to reproduce the shape of the template. Photocell 269 is held in a socket 270 which is fastened to the housing, and suitable flexible conductors are brought out from the photocell socket. The photocell is placed at such an angle that it will receive light reflected from the edge of template 138 when the inner circumference of tube 266 projects slightly beyond the rim of the template, or the photocell can pick up light reflected from the surface of turntable 139, or both. It is desirable that the edge of the template and the upper surface of the turntable be of good light-reflecting character. Shield 271 is attached to the casing to protect the photocell from extraneous light. The template and turntable can be placed in a light-tight box with flexible opaque fabric attached to bar 5, if desired. The interior surface of tube 266 may be polished to reflect light, or may be covered with a dark paint, as desired. Collimating lens 272 may also be included to align the light rays. This construction makes possible very accurate control as the circular light beam is held true, due to the contact of the sleeve with the template. A considerable quantity of light can affect the photocell with a very small over-hang of the tube with respect to the template. As the template is rotated, as in the devices of Figures 4, 6, or 7, the photocell or scanning unit 137 is automatically moved in alternate directions so that the inner rim of tube 266 is kept substantially in alignment with the edge of the template.

If it is desired to use transmitted or direct light or the photocell instead of reflected light, photocell 273 may be fastened in a suitable socket in bracket 274 which is attached to arm 5 and which extends beneath turntable 139 for a distance sufficient to allow enough movement of the assembly 137. In this case, turntable 139 may be transparent, or the template can project over the rim of the turntable. Therefore, when tube 266 projects slightly over the template or drawing, light strikes photocell 273 and starts a return movement as described before. Photocell 273 can be of large area to receive light from any point of the inner periphery of the end of tube 266, or a lens can be used.

Figure 8:
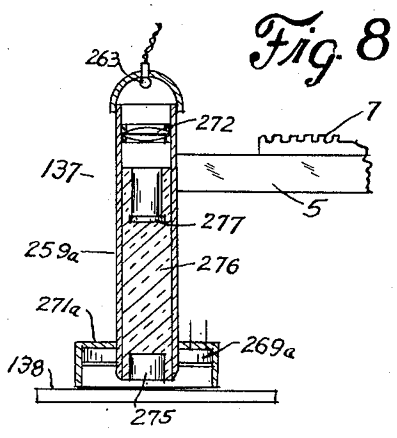
Figure 8 is a part sectional elevation of a modified photocell-lamp scanning, tracing, or sensing unit in which an annular light beam is used.

The unit 137 can be made with an annular type photocell 269*a* as indicated in Figure 8. In this case, cup-like light shield 271*a* has a central hole in which cylindrical casing 259*a* is placed, and the photocell and shield are supported above template 138. Opaque metal or other cylinder 275, of smaller diameter than the inner diameter of casing 259*a*, is fastened coaxially in the end of transparent quartz, Lucite, glass or other cylinder 276 which is held in casing 259*a* by means of screws. This construction has the advantage that the complete circle of the scanner may be used and the annular light space tends to reduce the effect of cross light beams and so to define a better circular light image. Further, the Lucite or quartz solid cylinder 276 reflects light well and also serves as a non-obstructing support for opaque element 275. The annular light beam has an additional advantage that a small amount of light peeping over the edge of a dark line or area represents a larger proportion of the total light than if a light beam of complete circular area is used. The sensitivity can, therefore, be greater. A considerable quantity of light will be reflected to the photocell from even a dark area if a circular area is used rather than an annular area. Another circular light shield 277 can be used, if desired, in order better to define the annular beam.

Figure 9:
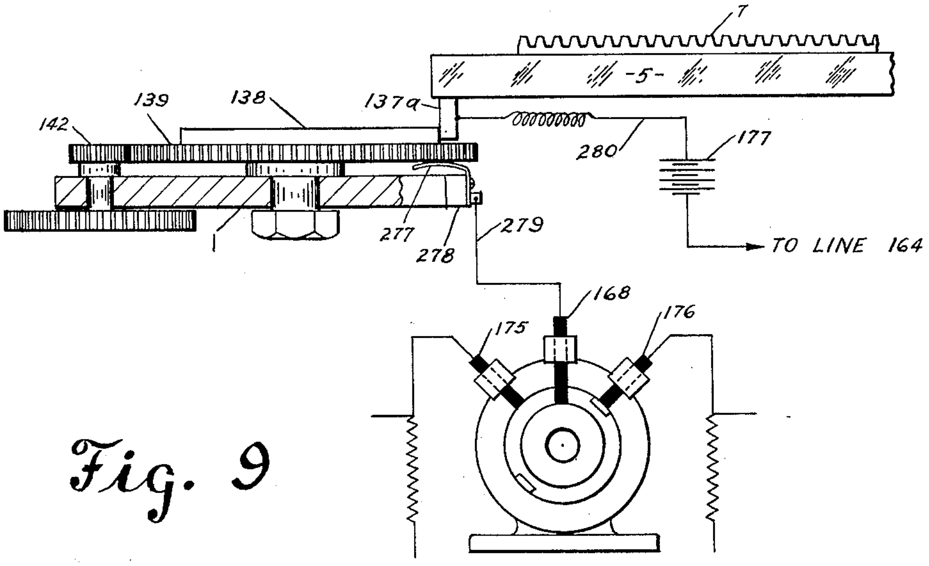
Figure 9 is an elevation showing a contact type sensing or scanning element in conjunction with a template and supporting turntable, with associated parts shown in fragmentary manner.

The use of a contact rod or other element instead of a photocell provides an accurate means for controlling the marking of the belt. This construction is shown in Figure 9 which has metal or other contact rod 137*a* attached to bar 5 with the axis of the rod preferably perpendicular to the plane of template 138. This template is preferably made of metal, but may be made of other electrically conductive material such as conductive rubber, graphite, or metal-coated or graphite-coated insulating material. The template preferably has sufficient thickness so that the bottom of rod 137*a* may be held out of contact with turntable 139. Resilient metal or other brush 277 is screwed to insulating block 278 which is fastened to plate 1. Brush 277 presses against the under surface of metal turntable 139 and accordingly is electrically connected with template 138. Conductor 279 is connected with brush 277, and flexible conductor 280 is connected to contact rod 137*a*. These two conductors can then be substituted for the cathode and anode leads from the photocells in the devices of Figure 4 or 6, or in equivalent circuits. Battery or other current source 177 would, of course, be connected in such manner that the polarity in the circuit is not changed. The make and break contact merely substitutes for the photocell and can be made quite accurate since only a very small displacement is necessary in order to make or break the circuit.

Figure 10:
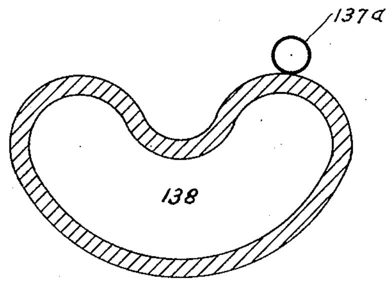
Figure 10 is a part-sectional elevation of a scanning device employing a source of radiation, a movable scanning or tracing tube, and a photocell or other radiation detector.

The contact rod may comprise a sharp pointed metal member and can be rapidly oscillated vertically to bring it into and out of contact with the template which may be an electrically conductive drawing or a metal or other conductive plate, as desired. Furthermore, the circular end of rod 137*a* may be allowed to slide over a template or drawing 138 (Figure 10) having a wide peripheral line of conductive material such as metal, metal powder, or graphite. When the rod is moved into contact with the line or band, the circuit is closed.

It should be understood that a record representing the shape or configuration of a template, drawing model, or other object in two or in three dimensions can comprise a disc, belt, wire, tape, or the like having punched holes, printed marks, magnetized spots or areas, electrical capacitative elements, electrically conductive spots or elements, embossed portions or other characterizations representing the whole shape of the object or any part thereof. While electrical means such as solenoids are shown for providing the tape, belt, or other member with characterizations which, together with the belt, form the record, yet it is obvious that the elements for imprinting, embossing, or punching the record, may be mechanically driven. The embossed characterizations, if used, can be employed to operate switches; and electrical capacitative, or contact elements can be used to close circuits. Similarly, magnetic and other pick-ups can be used.

It is obvious that changes of detail can be made without departing from the general principles I have disclosed.

What I claim is:

1. In a device for making a record representing configuration of an object, means for tracing said object along a plurality of axes, means for amplifying movements along said axes of said tracing means, means including a belt for recording characterizations representing configuration of said object, means associating said amplifying means with said recording means to produce said record, means for moving said belt, and means associating said amplifying means with said belt-moving means to cause movement of said belt in proportion to the fastest rate of movement of said tracing means along any said axis.

2. The device of claim 1, said belt-moving means including means for driving said belt in the same direction regardless of the direction of movement of said tracing and amplifying means.

3. The device of claim 1, said means associating said amplifying means with said belt-moving means including a plurality of connected pairs of selsyn motors.

4. In a device for making a record representing configuration of an object, means for tracing said object along a plurality of axes, means for amplifying movements of said tracing means along said axes, means for recording characterizations representing configuration of said object, means associating said amplifying means with said recording means to produce said record, means for causing relative movement between said recording means and said record, and means associating said amplifying means with said movement-causing means to cause said relative movement in proportion to the fastest rate of movement of said tracing means along any said axis.

5. The device of claim 4, said movement-causing means including means for causing said relative movement in the same sense, regardless of the direction of movement of said tracing and amplifying means.

6. The device of claim 4, said means associating said amplifying means with said movement-causing means including a plurality of connected pairs of self-synchronous motors.

7. In a device for making a record representing configuration of an object, means for tracing said object along a plurality of axes, means for amplifying movements of said tracing means along said axes, electrical circuit opening and closing means operated by said amplifying means and adapted to be opened and closed at rates depending upon the rates of movement of said tracing means along said axes, means electrically connected with said circuit opening and closing means for recording characterizations on said record representing configuration of said object, means for moving said record, and means controlled by said tracing means to cause movement of said record in proportion to the fastest rate of movement of said tracing means along any said axis.

8. The device of claim 4, said record-moving means including one-way clutch means and associated gearing for moving said record in the same direction, regardless of the direction of movement of said tracing means.

9. The device of claim 4, said recording means including a plurality of solenoids.

10. In a device for making a record representing configuration of an object, a rotary member for revolving said object, means including a motor for revolving said member at a speed less than that of said motor, first commutator means driven by said motor at faster speed than that of said member, a belt or tape, means associating said motor with said belt or tape to cause movement thereof, means including electrical sensing means for tracing said object, means including a step motor for causing movement of said tracing means relative to said member, circuit means connecting said electrical sensing means with said step motor to cause forward and reverse rotation thereof under control of said electrical sensing means, other commutator means driven by said step motor, means including electrical means for providing said belt or tape with characterizations representing movement of said member and said tracing means, and circuit means connecting said first and other commutator means with said electrical means.

11. The device of claim 10, and including means for supplying said step motor with phased, intermittent energy.

12. The device of claim 10, said electrical sensing means including a photocell.

13. The device of claim 10, said electrical sensing means including an electrical contact element and an electrically conductive element adapted to be touched intermittently by said contact element.

14. In a device for making a record representing configuration of an object, means for rotating said object, tracing means for following the shape of said object as it is being rotated, means including light-sensitive means for causing said tracing means automatically to follow configuration of said rotating object, means for amplifying movements of said tracing means and said rotating means, means for recording characterizations corresponding to movements of said rotating means and said tracing means, and means connecting said amplifying means with said recording means.

15. The device of claim 14, said means for causing said tracing means automatically to follow configuration of said rotating object including means for moving said tracing means along a plurality of axes.

16. In a device for making a record representing configuration of an object, means for rotating said object, electrical circuit means including light-sensitive means of variable conductivity for tracing said object as it is being rotated, means including a plurality of motors for causing said tracing means to follow configuration of said object along a plurality of axes as it is being rotated, means for amplifying movements of said tracing means, means for amplifying movements of said rotating means, circuit means controlled by said variable conductivity circuit means for automatically determining the direction of rotation of said motors to cause said tracing means to follow configuration of said rotating object, means for recording characterizations corresponding to movements of said rotating means and said tracing means, and means connecting said amplifying means with said recording means.

17. The device of claim 16, and including switch means to connect the direction-determining circuit means for each said motor sequentially with said variable conductivity circuit means.

18. In a device for making a record representing configuration of an object, means including light-sensitive means for tracing said object, means for moving said object, a first motor for causing movement of said light-sensitive means along one axis, another motor for causing movement of said light-sensitive means along another axis, electrical circuit means connecting said light-sensitive means and said motors to cause said motors to move said tracing means and light-sensitive means in direction in accordance with the degree of light received thereby, switch means periodically opened and closed by rotation of said first motor, other switch means periodically opened and closed by rotation of said other motor, third switch means periodically opened and closed by said object-moving means, a belt or tape, means connecting said object-moving means and said belt to cause movement thereof, and means including electrical means connected with said switch means for recording on said tape characterizations in accordance with movements of said light-sensitive means and said object-moving means.

19. The device of claim 18, said electrical circuit means including means for switching said light-sensitive means to control said motors alternately.

20. The device of claim 18, said tracing means including amplifying means for causing displacements of said light-sensitive means to produce relatively greater displacements of said switch means.

21. The device of claim 18, and means connecting said object-moving means and said third switch means to cause a displacement of the latter to be relatively greater than a corresponding displacement of said object-moving means.

22. The device of claim 18, said motors being adapted to move in steps.

23. The device of claim 18, said motors being adapted to move in steps, and said switch means comprising commutators and associated brushes.

24. In a device for making a record representing configuration of an object, means including light-sensitive means for tracing said object, means for moving said object, a step motor having a plurality of phases for causing movement of said light-sensitive means, means for distributing current to the phases of said step motor to cause step-by-step rotation thereof, electrical circuit means connecting said motor and said light-sensitive means to control the direction of rotation of said step motor in accordance with the degree of illumination of said light-sensitive means, a belt or tape for recording characterizations thereon to represent configuration of an object, means for moving said tape and said object, electrical means for recording characterizations on said tape, switch means opened and closed as a result of movement of said motor and said object-moving means, and circuit means connecting said switch means and said electrical recording means.

25. In a device for making a record representing configuration of an object, means for rotating said object, tracing means the electrical conductivity of which is varied in accordance with its position relative to said object, means including a plurality of electromagnetic devices for moving said tracing means along a plurality of axes relative to said object, electrical means connecting said tracing means and said electromagnetic devices for causing variation of electrical energization of said electromagnetic devices in accordance with variations of conductivity of said tracing means as a result of rotation of said object relative thereto to cause said tracing means to follow configuration of said object, means for amplifying movements of said tracing means, means for amplifying movements of said rotating means, means for recording characterizations corresponding to movements of said rotating means and said tracing means, and means connecting said amplifying means with said recording means to cause operation of the latter in accordance with movements of said amplifying means.

26. The device as described in claim 25, and including switch means for connecting said electromagnetic means effectively into circuit sequentially.

27. In a device for making a record representing configuration of an object, means for rotating said object, tracing means the impedance of which is varied in accordance with its position relative to said object, means including a motor for moving said tracing means relative to said object, electrical means connecting said tracing means with said motor to cause actuation thereof in accordance with variations of said impedance to cause said tracing means to follow configuration of said object as it is rotated, means including electrical means for recording characterizations corresponding to movements of said rotating means and said tracing means, electrical circuit means for energizing said electrical recording means, and electrical switch means connected with said circuit means for varying current in said circuit in accordance with movements of said tracing means, said switch means being actuated by said means for moving said tracing means.

28. In a device for making a record representing configuration of an object, tracing means including impedance means the impedance of which is varied in accordance with its position relative to said object, means including a three phase step motor for causing relative movement between said object and said tracing means, said motor having winding means for each said phase, current distributor means for supplying current to said winding means in predetermined order, electrical means connecting said current distributor means and said winding means and adapted to reverse two connections thereof to reverse the order of energization of said winding means, electrical means connecting said tracing impedance means with said electrical reversing means to cause reversal of said order when said impedance means has predetermined impedance, means including electrical means for recording characterizations representing configuration of said object, and means including variable impedance circuit means driven by said step motor and connected with said recording electrical means for causing the recording of said characterizations in accordance with configuration of said object.

29. In a device for making a record representing configuration of an object, tracing means including impedance means the impedance of which is varied in accordance with its position relative to said object, means including a plurality of electromagnetic devices for moving said tracing means along a plurality of axes relative to said object, first electrical means connecting said variable impedance tracing means with said electromagnetic devices for causing variation of electrical energization of said electromagnetic devices in accordance with variations of impedance of said tracing means to cause said tracing means to follow configuration of said object, means including second electrical means for recording characterizations, and means including variable impedance circuit means operated by said moving means and connected with said recording electrical means for causing the recording of said characterizations in accordance with configuration of said object, said electromagnetic devices comprising step motors.

30. In a device for making a record representing configuration of an object, tracing means including impedance means the impedance of which is varied in accordance with its position relative to said object, means including a plurality of electromagnetic devices for moving said tracing means along a plurality of axes relative to said object, first electrical means connecting said variable impedance tracing means with said electromagnetic devices for causing variation of electrical energization of said electromagnetic devices in accordance with variations of impedance of said tracing means to cause said tracing means to follow configuration of said object, means including second electrical means for recording characterizations, and means including variable impedance circuit means operated by said moving means and connected with said recording electrical means for causing the recording of said characterizations in accordance with configuration of said object, said variable impedance tracing means comprising radiation sensitive means.

31. In a device for making a record representing configuration of an object, tracing means including impedance means the impedance of which is varied in accordance with its position relative to said object, means including a plurality of electromagnetic devices for moving said tracing means along a plurality of axes relative to said object, first electrical means connecting said variable impedance tracing means with said electromagnetic devices for causing variation of electrical energization of said electromagnetic devices in accordance with variations of impedance of said tracing means to cause said tracing means to follow configuration of said object, means including second electrical means for recording characterizations, and means including variable impedance circuit means operated by said moving means and connected with said recording electrical means for causing the recording of said characterizations in accordance with configuration of said object, said first electrical means including means controlled by said variable impedance tracing means for supplying said electromagnetic devices with half waves of alternating current to cause movement thereof in direction as determined by the impedance of said variable impedance tracing means.

32. In a device for making a record representing configuration of an object, tracing means including impedance means the impedance of which is varied in accordance with its position relative to said object, means including a plurality of electromagnetic devices for moving said tracing means along a plurality of axes relative to said object, first electrical means connecting said variable impedance tracing means with said electromagnetic devices for causing variation of electrical energization of said electromagnetic devices in accordance with variations of impedance of said tracing means to cause said tracing means to follow configuration of said object, means including second electrical means for recording characterizations, and means including variable impedance circuit means operated by said moving means and connected with said recording electrical means for causing the recording of said characterizations in accordance with configuration of said object, said electromagnetic devices comprising motors, said first electrical means including means controlled by said variable impedance tracing means for supplying said motors with half waves of alternating current to cause rotation thereof in direction as determined by the impedance of said variable impedance tracing means.

33. In a device for making a record representing configuration of an object, tracing means including impedance means the impedance means the impedance of which is varied in accordance with its position relative to said object, means including a plurality of electromagnetic devices for moving said tracing means along a plurality of axes relative to said object, first electrical means connecting said variable impedance tracing means with said electromagnetic devices for causing variation of electrical energization of said electromagnetic devices in accordance with variations of impedance of said tracing means to cause said tracing means to follow configuration of said object, means including second electrical means for recording characterizations, and means including variable impedance circuit means operated by said moving means and connected with said recording electrical means for causing the recording of said characterizations in accordance with configuration of said object, said first electrical means including means controlled by said variable impedance tracing means for supplying said electromagnetic devices with half waves of alternating current to cause movement thereof in direction as determined by the impedance of said variable impedance tracing means, and switching means for connecting a plurality of said electromagnetic devices sequentially in circuit with said variable impedance tracing means to be controlled thereby.

34. In a device for making a record representing configuration of an object, means for rotating said object, electrical tracing means the impedance of which is varied in accordance with its position relative to said object, means including a plurality of motors for moving said tracing means relative to said object along a plurality of axes, and electrical means connecting said tracing means with said moving means to cause said tracing means to follow configuration of said object as it is rotated, and including electrical means controlled by said variable impedance tracing means for supplying said motors with half waves of alternating current to cause rotation thereof in direction as determined by the impedance of said variable impedance means.

35. In a device for making a record representing configuration of an object, tracing means including impedance means the impedance of which is varied in accordance with its position relative to said object, means including a plurality of electromagnetic devices for moving said tracing means along a plurality of axes relative to said object, first electrical means connecting said variable impedance tracing means with said electromagnetic devices for causing variation of electrical energization of said electromagnetic devices in accordance with variations of impedance of said tracing means to cause said tracing means to follow configuration of said object, means including second electrical means for recording characterizations, and means including variable impedance circuit means operated by said moving means and connected with said recording electrical means for causing the recording of said characterizations in accordance with configuration of said object, and including a plurality of pairs of opposed electronic tubes associated with said variable impedance tracing means for supplying said electromagnetic devices with half waves of alternating current to cause movement thereof in direction as determined by the impedance of said variable impedance means, and switching means for connecting a plurality of said electromagnetic devices sequentially in circuit to be controlled by said variable impedance means.

36. In a device for making a record representing configuration of an object, tracing means including impedance means the impedance of which is varied in accordance with its position relative to said object, means including a plurality of electromagnetic devices for moving said tracing means along a plurality of axes relative to said object, first electrical means connecting said variable impedance tracing means with said electromagnetic devices for causing variation of electrical energization of said electromagnetic devices in accordance with variations of impedance of said tracing means to cause said tracing means to follow configuration of said object, means including second electrical means for recording characterizations, and means including variable impedance circuit means operated by said moving means and connected with said recording electrical means for causing the recording of said characterizations in accordance with configuration of said object, and including electrical means controlled by said variable impedance tracing means for supplying said electromagnetic devices with half waves of alternating current to cause movement thereof in direction as determined by the impedance of said variable impedance tracing means, and switching means for connecting a plurality of said electromagnetic devices sequentially in circuit with said variable impedance means to be controlled thereby, the frequency of said alternating current being greater than the rate of said switching from one electromagnetic device to another electromagnetic device.

References Cited in the file of this patent

UNITED STATES PATENTS

| | | |
|---|---|---|
| 36,411 | Krausch | Sept. 9, 1862 |
| 623,473 | Hill | Apr. 18, 1899 |
| 1,172,058 | Scheyer | Feb. 15, 1916 |
| 1,500,086 | Liebender | July 1, 1924 |
| 1,567,681 | Russen | Dec. 29, 1925 |
| 2,111,815 | Schwartz | Mar. 22, 1938 |
| 2,172,313 | Young | Sept. 5, 1939 |
| 2,365,365 | Trinkle | Dec. 19, 1944 |
| 2,438,098 | Tandler et al. | Mar. 16, 1948 |
| 2,461,585 | Anderson | Feb. 15, 1949 |
| 2,475,245 | Leaver et al. | July 5, 1949 |
| 2,484,968 | Sponaugle | Oct. 18, 1949 |
| 2,489,305 | McLennan | Nov. 29, 1949 |
| 2,594,716 | Bailey | Apr. 29, 1952 |
| 2,611,115 | Johnston | Sept. 16, 1952 |
| 2,628,539 | DeNeergard | Feb. 17, 1953 |